United States Patent [19]
Dieterich

[11] Patent Number: 4,967,263
[45] Date of Patent: Oct. 30, 1990

[54] WIDESCREEN TELEVISION SIGNAL PROCESSOR SYSTEM WITH INTERPOLATOR FOR REDUCING ARTIFACTS

[75] Inventor: Charles B. Dieterich, Kingston, N.J.

[73] Assignee: General Electric Company, Princeton, N.J.

[21] Appl. No.: 241,684

[22] Filed: Sep. 7, 1988

[51] Int. Cl.[5] .............................................. H04N 9/64
[52] U.S. Cl. ....................................... 358/11; 358/37; 358/140
[58] Field of Search ............................ 358/11, 37, 140

[56] References Cited

U.S. PATENT DOCUMENTS

| | | | |
|---|---|---|---|
| 4,287,528 | 9/1981 | Levy | 358/146 |
| 4,583,113 | 4/1986 | Pritchard | 358/11 |
| 4,605,950 | 8/1986 | Goldberg et al. | 358/11 |
| 4,698,673 | 10/1987 | Johnson | 358/11 |
| 4,814,873 | 3/1989 | Maekang | 358/11 |

FOREIGN PATENT DOCUMENTS 0159181  10/1985  European Pat. Off. .

OTHER PUBLICATIONS

M. A. Isnardi, et al., "Encoding for Compatibility and Recoverability in the ACTV System", *IEEE Transactions on Broadcasting*, vol. BC-33, No. 4, Dec. 1987, pp. 116–123.

M. A. Isnardi, et al., "Decoding Issues in the ACTV System", *IEEE Transactions on Consumer Electronics*, vol. 34, No. 1, Feb. 1988, pp. 111–120.

Primary Examiner—John W. Shepperd
Attorney, Agent, or Firm—Joseph S. Tripoli; Eric P. Herrmann; Ronald H. Kurdyla

[57] ABSTRACT

An NTSC compatible widescreen EDTV system encodes a television signal via a process including intraframe averaging of mutually exclusive successive paired groups of image pixels above a given frequency. At a decoder, intraframe averaged luminance image information is interpolated on a line-by-line basis to help reduce unwanted jagged diagonal image artifacts. Vertical peaking is associated with intraframe averaging at the encoder.

19 Claims, 9 Drawing Sheets

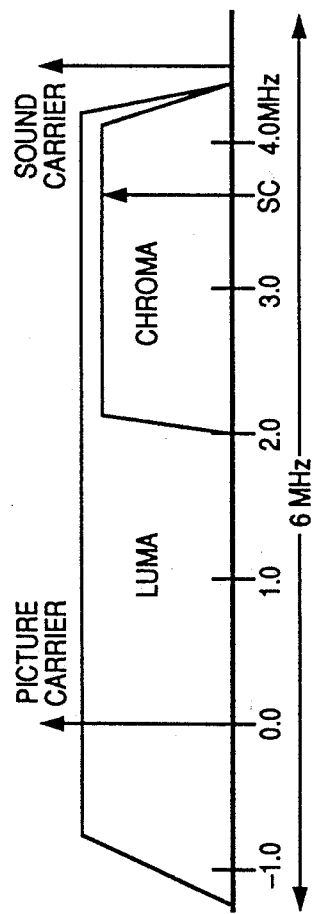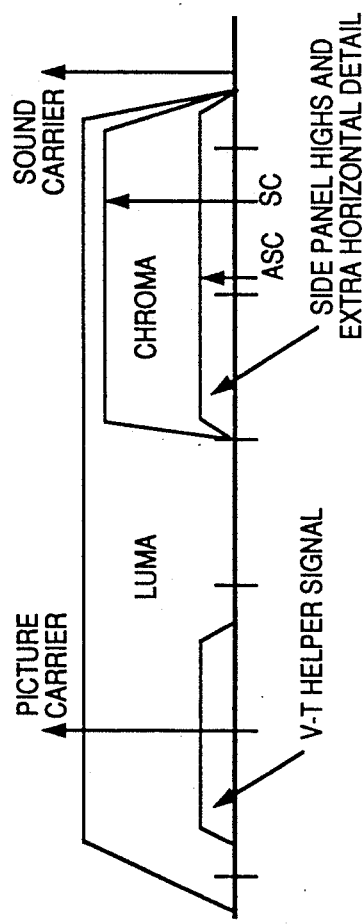

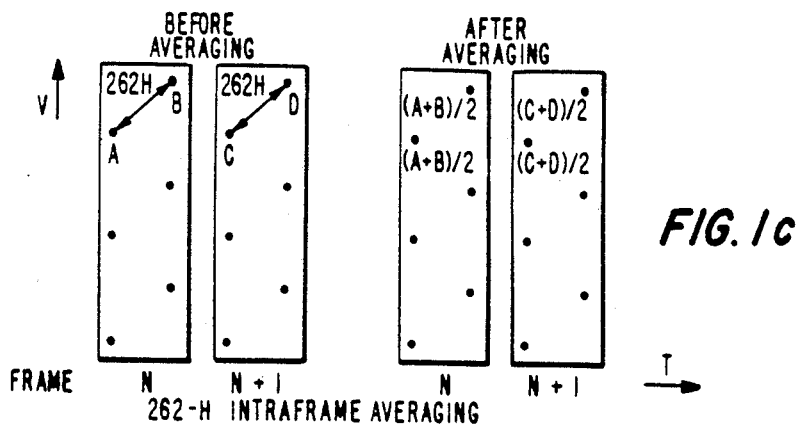
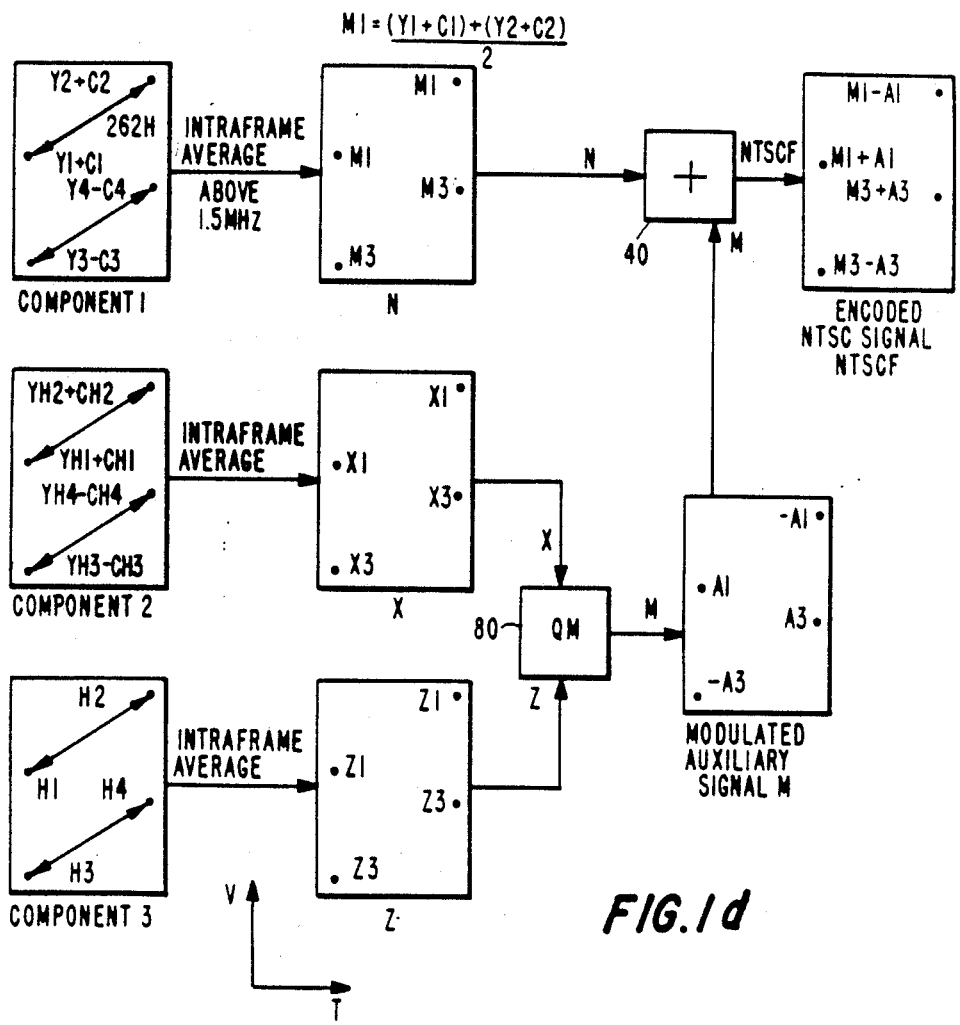
FIG. 1c
FIG. 1d

WIDESCREEN TELEVISION SIGNAL PROCESSOR SYSTEM WITH INTERPOLATOR FOR REDUCING ARTIFACTS

BACKGROUND OF THE INVENTION

This invention concerns a video signal interpolator for significantly reducing or eliminating unwanted diagonal image artifacts in an image displayed by a system employing intraframe signal processing techniques.

A conventional television receiver, such as a receiver in accordance with NTSC broadcast standards adopted in the United States and elsewhere, has a 4:3 aspect ratio (the ratio of the width to the height of a displayed image). Recently, there has been interest in using higher aspect ratios for television receiver systems, such as 2:1, 16:9 or 5:3, since such higher aspect ratios more nearly approximate or equal the aspect ratio of the human eye than does the 4:3 aspect ratio of a conventional television receiver. Video information signals with a 5:3 aspect ratio have received particular attention since this ratio approximates that of motion picture film, and thus such signals can be transmitted and received without cropping the image information. However, widescreen television systems which simply transmit signals having an increased aspect ratio as compared to conventional systems are incompatible with conventional aspect ratio receivers. This makes widespread adoption of widescreen systems difficult.

It is therefore desirable to have a widescreen system which is compatible with conventional television receivers. One such system is disclosed in a copending U.S. patent application of C. H. Strolle et al., Ser. No. 078,150 titled "Compatible Widescreen Television System", filed July 27, 1987. It is even more desirable to have such a compatible widescreen system with provisions for enhancing or extending the definition of the displayed image so as to provide extra image detail. For example, such widescreen EDTV (extended definition television) system may include apparatus for providing a progressively scanned image. A system of this type is disclosed in a copending U.S. patent application Ser. No. 139,338 of M. A. Isnardi and R. N. Hurst, Jr., titled "Apparatus for Pre-conditioning Auxiliary Television Signal Information", filed Dec. 29, 1987. The system disclosed by Isnardi and Hurst employs signal time expansion and compression and intraframe processing of center and side panel image information.

It has been observed that intraframe processing of video image information can result in reduced diagonal edge resolution and produces unwanted jagged diagonal artifacts. In accordance with the principles of the present invention, there is disclosed herein apparatus which assists to reduce the diagonal image artifacts.

SUMMARY OF THE INVENTION

Apparatus in accordance with the present invention includes means, located in a decoder, for interpolating a video signal which has been subjected to intraframe processing such as in an encoder. In accordance with a feature of the invention, the process of intraframe processing includes vertical peaking of image information subject to interpolation. Vertical peaking produces several benefits, including preventing loss of vertical resolution at the receiver, increasing the signal-to-noise ratio of high vertical frequencies, and reducing aliasing associated with intraframe processed signals. In accordance with a further feature of the invention, the signal which is to be encoded by intraframe processing is also vertically lowpass filtered to reduce aliasing artifacts.

The disclosed apparatus is described in the context of a compatible widescreen EDTV television system employing an intraframe signal processing, e.g., averaging, technique. The widescreen EDTV signal contains plural components, including a main first component containing center panel and time compressed side panel information, and an auxiliary second component containing side panel information. In the main component, only center panel information is subjected to intraframe processing. The time compressed side panel information portion of the main component is not subjected to intraframe processing. In the disclosed compatible widescreen EDTV television system, an original high resolution, progressively scanned widescreen signal is encoded to include four components. The four components are processed separately before being recombined in a single signal transmission channel.

A first component is a main 2:1 interlaced signal with a standard 4:3 aspect ratio. This component comprises a central portion of the widescreen signal that has been time expanded to occupy nearly the entire 4:3 aspect ratio active line time, and side panel horizontal low frequency information that has been time compressed into the left and right horizontal image overscan regions where such information is hidden from view in a standard television receiver display. Only the central portion of this component is subjected to intraframe averaging and vertical peaking above a given frequency.

A second component is an auxiliary 2:1 interlaced signal comprising left and right side panel high frequency information that have each been time expanded to half the active line time. Thus expanded side panel information occupies substantially the entire active line time. This component is "mapped" so as to occupy the same time period as the center portion of the first component, and is intraframe averaged.

A third component is an auxiliary 2:1 interlaced signal, derived from the widescreen signal source, comprising high frequency horizontal luminance detail information between approximately 5.0 MHz and 6.0 MHz. This component is also "mapped" so as to occupy the same time period as the center portion of the first component, and is intraframe averaged. The intraframe averaged second and third components quadrature modulate a phase controlled auxiliary subcarrier which is combined with the intraframe averaged first component.

An optional fourth component is an auxiliary 2:1 interlaced "helper" signal comprising temporal field difference luminance detail information to help reconstruct missing image information at a widescreen EDTV receiver.

At a widescreen EDTV receiver, a composite signal containing the described four components is decoded into the constituent four components. The decoded components are processed separately and used to develop an image representative widescreen signal with enhanced resolution.

DESCRIPTION OF THE DRAWING

FIGS. 1b–1e contain diagrams helpful in understanding the operation of the disclosed system;

A system intended to transmit wide aspect ratio pictures, e.g., 5:3, through a standard, e.g., NTSC, broadcast channel should achieve a high quality picture display by a widescreen receiver, while greatly reducing or eliminating observable degradations in a standard 4:3 aspect ratio display. The use of signal compression techniques on the side panels of a picture takes advantage of the horizontal overscan region of a standard NTSC television receiver display, but may sacrifice image resolution in the side panel regions of a reconstructed widescreen picture. Since compression in time results in an expansion in the frequency domain, only low frequency components would survive processing in a standard television channel, which exhibits a smaller bandwidth compared with that required for a widescreen signal. Thus, when the compressed side panels of a compatible widescreen signal are expanded in a widescreen receiver, there results a noticeable difference between the resolution or high frequency content of the center portion of a displayed widescreen picture and the side panels, unless steps are taken to avoid this effect as will be discussed. This noticeable difference is due to the fact that low frequency side panel information would be recovered, but high frequency information would be lost due to video channel bandlimiting effects.

Figure 1:
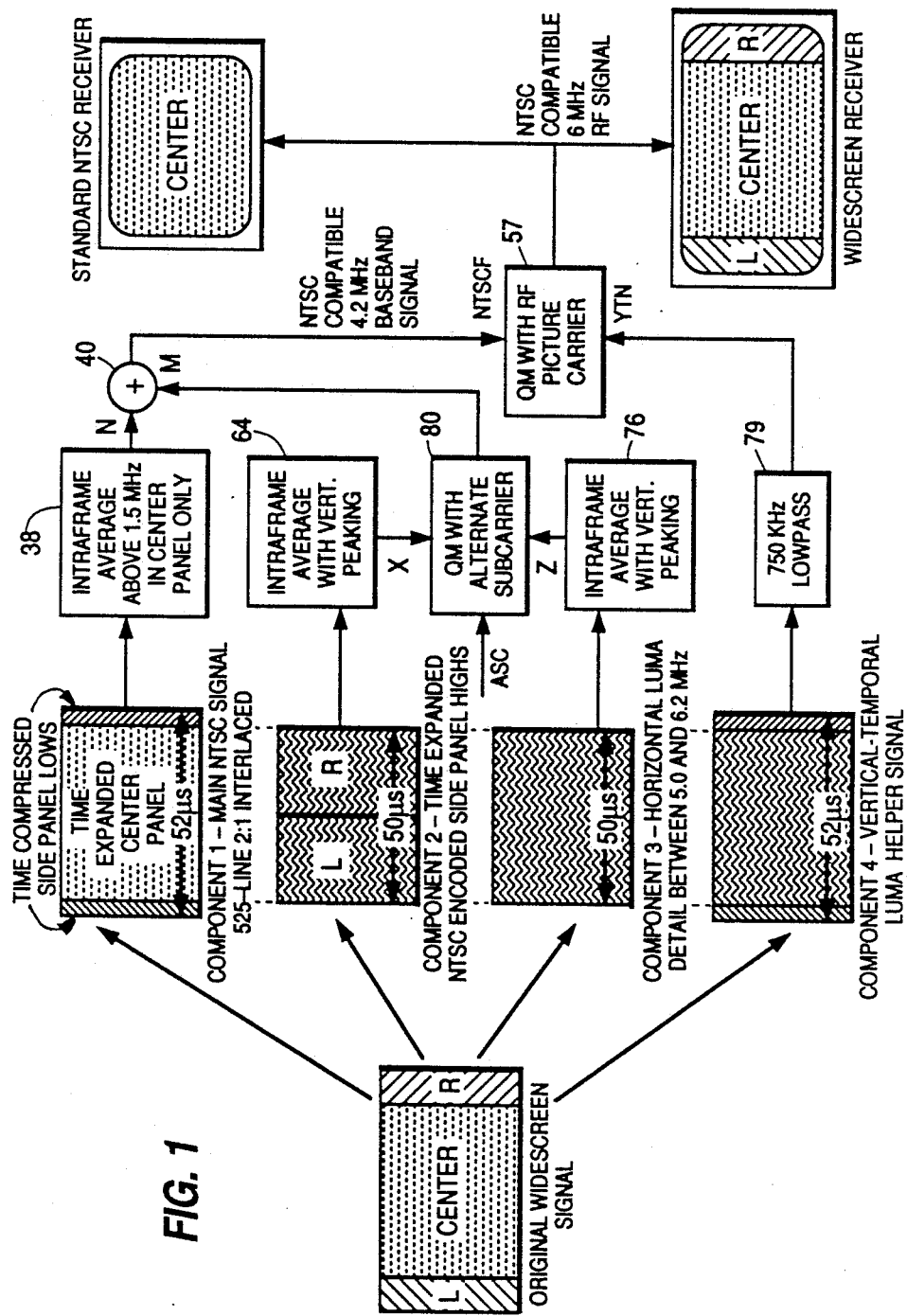
FIG. 1 illustrates a general overview of a compatible widescreen EDTV encoder system including apparatus in accordance with the present invention.
Figure 1A:
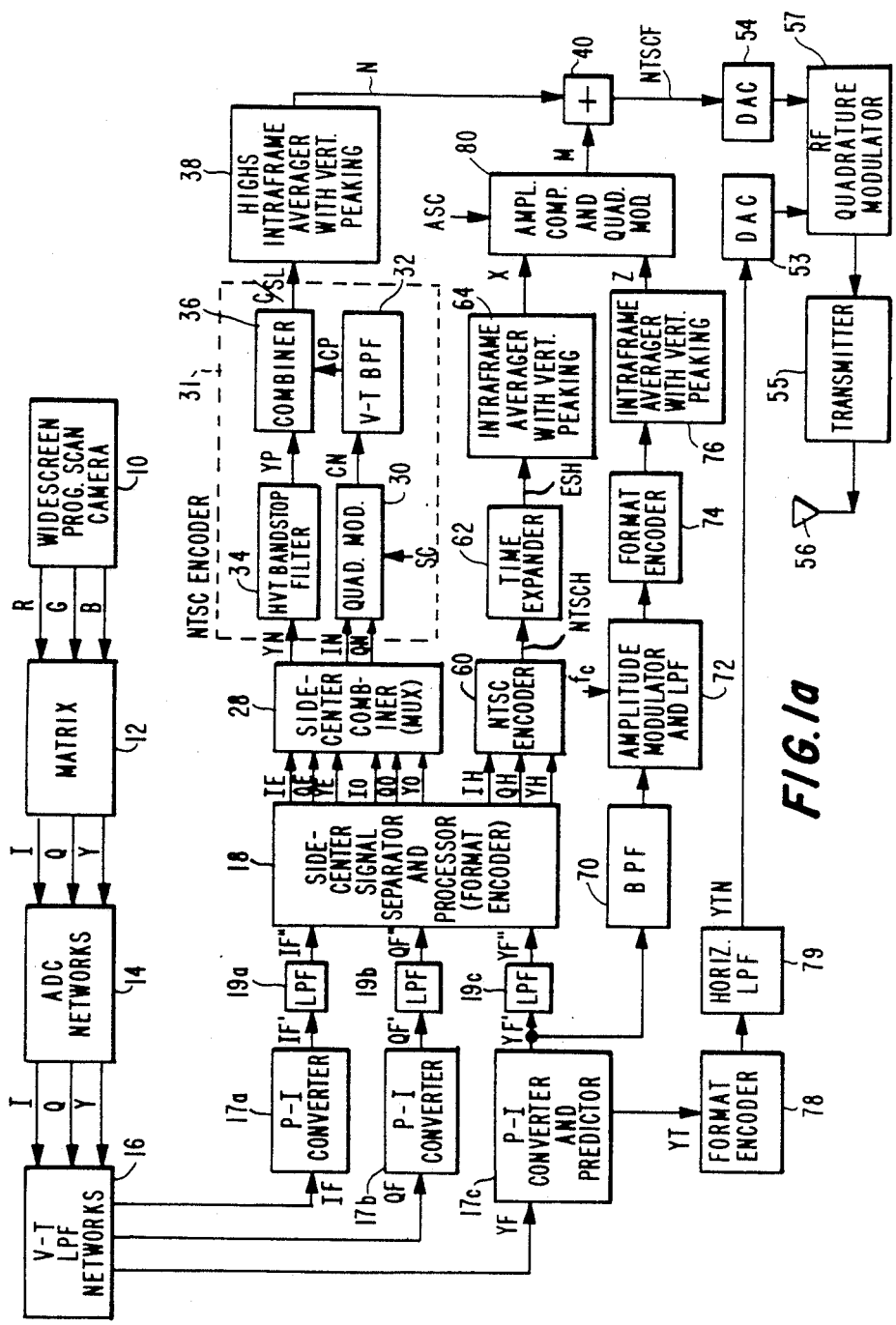
FIG. 1a shows a detailed block diagram of the encoder for the disclosed system.

In the system of FIG. 1, elements which are common to the more detailed system of FIG. 1a are identified by the same reference number. As shown in FIG. 1, an original widescreen progressive scan signal with left, right and center panel information is processed so as to develop four separate encoding components. These four components were described above, and are illustrated pictorially in FIG. 1. Processing of the first component (containing time expanded center portion information and time compressed side portion low frequency information) is such that the resulting luminance bandwidth does not exceed the NTSC luminance bandwidth of 4.2 MHz in this example. This signal is color encoded in standard NTSC format, and the luminance and chrominance components of this signal are suitable pre-filtered (e.g., using field comb filters) to provide improved luminance-chrominance separation at both standard NTSC and widescreen receivers.

The time expansion of the second component (side panel high frequency information) reduces its horizontal bandwidth to about 1.16 MHz. This component is spatially uncorrelated with the main signal (the first component), and special precautions are taken to mask its visibility on standard NTSC receivers, as will be discussed.

The 5.0 to 6.0 MHz extended high-frequency luminance information content of the third component is first shifted downward in frequency to a frequency range of 0 to 1.0 MHz before further processing.

The fourth component (temporal field difference helper) is mapped into standard 4:3 format to correlate it with the main signal component to thereby mask its visibility on standard NTSC receivers, and is horizontally bandwidth limited to 750 KHz.

As will be discussed in greater detail subsequently, the first, second, and third components are processed by respective intraframe averagers 38, 64, and 76 (a type of vertical-temporal (V-T) filter) to eliminate V-T crosstalk between the main and auxiliary signal components at a widescreen receiver. The center panel information of the first component is intra-frame averaged and vertically peaked above approximately 1.5 MHz. The second and third intraframe averaged components, identified as X and Z, are non-linearly amplitude compressed prior to quadrature modulating a 3.108 MHz auxiliary subcarrier ASC, having a field alternating (inverting) phase, in a block 80. A modulated signal (M) from block 80 is added to the intraframe averaged first component (N) in an adder 40. A resulting output signal is a 4.2 MHz bandwidth baseband signal (NTSCF) that, together with a 750 KHz low pass filtered fourth component (YTN) from a filter 79, quadrature modulates an RF picture carrier in a block 57 to produce an NTSC compatible RF signal which can be transmitted to a standard NTSC receiver or a widescreen progressive scan receiver via a single, standard bandwidth, broadcast channel.

The use of time compression on the first component allows low frequency side panel information to be squeezed entirely into the horizontal overscan region of a standard NTSC signal. The high frequency side panel information of the second component and the high frequency luminance detail information of the third component are spectrally shared with the standard NTSC signal through the video transmission channel, in a manner transparent to a standard receiver, through the use of an auxiliary subcarrier quadrature modulation technique involving block 80 as will be discussed. When received by a standard NTSC receiver, only the center panel portion of the main signal (the first component) is seen. The second and third components may create a low amplitude interference pattern that is not perceived at normal viewing distances and at normal picture control settings. The fourth component is removed completely in receivers with synchronous video detectors. In receivers with envelope detectors, the fourth component is processed but not perceived because it is correlated with the main signal.

The main signal (component 1) exhibits a standard NTSC active horizontal line interval of approximately 52 microseconds ($\mu$s). Only high frequency information of this component above about 1.5 MHz is intraframe averaged. The time compressed side panel low frequency information of this component is not subjected to the process of intraframe averaging. It has been found that such selective intraframe processing of the main component improves the resolution of diagonal side panel image information by eliminating undesirable jagged diagonal artifacts, sometimes referred to a "jaggies", which would otherwise be produced in a reconstructed image if the compressed side panel information of the main signal were intraframe averaged.

In this regard it is noted that the side panel low frequency information of the main signal component has been time compressed with a side compression factor (SCF) of approximately six. If such time compressed information is intraframe averaged before being time expanded at the receiver for reconstructing the image, the reconstructed side panel image information would exhibit jagged diagonals because the horizontal frequency at which intraframe averaging began would then be approximately SCF times lower than for the center panel. Diagonal image information becomes increasingly distorted ("jagged") as the frequencies over which intraframe averaging is performed decrease. For example, if the main signal is intraframe averaged for frequencies above 1.5 MHz and the side panel low frequency information of component 1 is time compressed with an SCF of six, intraframe averaging of the side panel information effectively begins at a much lower frequency of 250 KHz (1.5 MHz/SCF), whereby jagged diagonals result. Thus jagged diagonals would be more noticeable in the reconstructed side panel regions. Since component 1 is not intraframe averaged in the time compressed side panel regions, the entire range of original frequencies in these regions (0–700 KHz) retains full vertical resolution without distortion due to jagged diagonal artifacts. However, the intraframe averaging performed on component 1 in the center panel region is likely to result in unwanted jagged diagonal artifacts, which are reduced by means of a luminance signal interpolator at the receiver decoder, together with vertical peaking associated with the intraframe processor at the encoder. Loss of vertical sharpness caused by this interpolation can be compensated for by vertical peaking in the encoder.

Component 2, containing the left and right side panel high frequency information, is mapped so that it occupies the same time period as the center panel portion of component 1. Thus the left and right side panel highs are time expanded to fill the entire center panel region whereby component 2 exhibits an active horizontal scanning interval of approximately 50 $\mu$s, which corresponds to the horizontal scanning interval of the center panel portion of component 1. For this purpose the side expansion factor (SEF) is about 4.32, compared to an SEF of about 4.49 which would be required to expand the left and right side panel information of component 2 to the full active line time of 52 $\mu$s.

Both components 2 and 3 are mapped into the center panel region because of the intraframe processing performed on main component 1 and auxiliary components 2 and 3. As will be explained subsequently, intraframe averaging is a process which facilitates the separation of two previously combined signal components, such as main signal N and auxiliary modulated signal M in this example. Since the region of intraframe processing in component 1 has been reduced to encompass only the 50 $\mu$s center panel region, the mapping of modulating components 2 and 3 is similarly modified to encompass only the center panel region.

As mentioned above, component 3 is mapped so as to coincide with the center panel interval by linearly time compressing the extended horizontal luminance information to 50 $\mu$s. Time compressing component 3 from 52 $\mu$s sacrifices some spatial correlation with main component 1, but more importantly assures that the center and side panel regions of a reconstructed image will exhibit similar horizontal resolution. Although spatial correlation between components 1 and 3 is desirable to mask the effects of crosstalk between the auxiliary subcarrier and the main signal, the importance of maintaining perfect spatial correlation of component 3 is reduced because the auxiliary subcarrier already contains noncorrelated information in the form of component 2. The amount of spatial correlation given up on component 3 is negligible and is outweighed by the resulting similar center and side panel horizontal resolution. Component 4 is not intraframe averaged and remains unchanged, exhibiting a full 52 $\mu$s active line time consistent with the main signal.

In the decoder, as will be discussed in connection with FIG. 4, intraframe processing is performed only with respect to the center panel region for separating signals M and N. After demodulating component M into constituent components 2 and 3, components 2 and 3 are mapped into their original time slots, i.e., to occupy a full active line interval of 52 $\mu$s.

FIGS. 1b and 1b' illustrate the RF spectrum of the disclosed EDTV widescreen system, including the auxiliary information, compared to the RF spectrum of a standard NTSC system. In the spectrum of the disclosed system the side panel highs and the extra high frequency horizontal luminance detail information extend approximately 1.16 MHz on either side of the 3.108 MHz auxiliary subcarrier (ASC) frequency. The V-T helper signal information (component 4) extends 750 KHz on either side of the main signal picture carrier frequency.

A widescreen progressive scan receiver includes apparatus for reconstructing the original widescreen progressive scan signal. Compared to a standard NTSC signal. The reconstructed widescreen signal has left and right side panels with standard NTSC resolution, and a 4:3 aspect ratio center panel with superior horizontal and vertical luminance detail particularly in stationary portions of an image.

Two basic considerations govern the signal processing technique associated with the development and processing of the first, second, third, and fourth signal components. These considerations are compatibility with existing receivers, and recoverability at the receiver.

Full compatibility implies receiver and transmitter compatibility such that existing standard receivers can receive widescreen EDTV signals and produce a standard display without special adaptors. Compatibility in this sense requires, for example, that the transmitter image scanning format is substantially the same as, or within the tolerance of, the receiver image scanning format. Compatibility also means that extra non-standard components must be physically or perceptually hidden in the main signal when displayed on standard receivers. To achieve compatibility in the latter sense, the disclosed system uses the following techniques to hide the auxiliary components.

As discussed above, the side panel lows are physically hidden in the normal horizontal overscan region of a standard receiver. Component 2, which is a low-energy signal compared to the side panel lows component, and component 3, which is a normally low energy high frequency detail signal, are amplitude compressed and quadrature modulated onto an auxiliary subcarrier at 3.108 MHz, which is an interlaced frequency (an odd multiple of one-half the horizontal line rate). The frequency, phase, and amplitude of the auxiliary subcarrier are chosen so that the visibility of the modulated auxiliary subcarrier signal is reduced as much as possible, e.g., by controlling the phase of the auxiliary subcarrier from field so that it alternates 180° from one field to the next, unlike the phase of the chrominance subcarrier from one field to the next. Although the modulated auxiliary subcarrier components reside entirely within the chrominance passband (2.0–4.2 MHz), the modulated auxiliary subcarrier components are perceptually hidden because they are displayed as field rate complementary color flicker, which is not perceived by the human eye at normal levels of chrominance saturation. Also, nonlinear amplitude compression of the modulation components prior to amplitude modulation advantageously reduces instantaneous amplitude overshoots to an acceptable lower level. Component 3 is spatially correlated with respect to the central information portion of component 1 and is slightly less spatially correlated with respect to the left and right information portions of component 1. This is accomplished by means of a format encoder as will be discussed.

Component 4, the "helper" signal, also is hidden by time expanding the center panel information to match the standard 4:3 format, thereby spatially correlating component 4 with the main signal. Component 4 is removed at standard receivers with synchronous detectors, and is perceptually hidden at standard receivers with envelope detectors because it is spatially correlated with the main signal.

Recovery of components 1, 2, and 3 at a widescreen progressive scan receiver is accomplished by utilizing a process of intraframe processing at the transmitter and receiver. This process is associated with elements 38, 64, and 76 in the transmitter system of FIGS. 1 and 1a, and with associated elements at the receiver as will be discussed. Intraframe averaging is one type of signal conditioning technique which prepares two visually correlated signals for mutual combining so that they can be recovered efficiently and accurately afterwards, such as by means of a field storage device, free from V-T (vertical-temporal) crosstalk even in the presence of motion in the case of image representative signals. The type of signal conditioning employed for this purpose essentially involves making two signals identical on a field basis, i.e., by obtaining two samples with identical values a field apart. Intraframe averaging is a convenient technique for achieving this objective, but other techniques can also be used. Intraframe averaging is basically a linear, time varying digital pre-filtering and post-filtering process to ensure the accurate recovering of two visually correlated combined signals. Horizontal crosstalk is eliminated by guardbands between horizontal pre-filters at the transmitter encoder and post-filters at the receiver decoder.

Intraframe averaging is a form of paired (grouped) pixel processing. The process of intraframe averaging in the time domain is illustrated generally by FIG. 1c, wherein pairs of fields are made identical by averaging pixels (A, B and C, D) that are 262H apart. The average value replaces the original values in each paired group. FIG. 1d illustrates the process of intraframe averaging in the context of the system of FIG. 1. Starting with components 2 and 3, pairs of pixels (picture elements) 262H apart within a frame are averaged, and the average value (e.g. X1, X3 and Z1, Z3) replaces the original pixel values. This V-T averaging occurs within a frame and does not cross frame boundaries. In the case of component 1, intraframe averaging is performed only on center panel information above approximately 1.5 MHz so as not to affect lower frequency vertical detail information. In the case of components 1 and 2, intraframe averaging is performed on a composite signal including luminance (y) and chrominance (c) components throughout the chrominance band. The chrominance component of the composite signal survives intraframe averaging because pixels 262H apart are "in-phase" with respect top the color subcarrier. The phase of the new auxiliary subcarrier is controlled so that it is exactly out of phase for pixels 262H apart, and is unlike the phase of the chrominance subcarrier. Thus when components 2 and 3 (after quadrature modulation) are added to component 1 in unit 40, pixels 262H apart have the form $(M+A)$ and $(M-A)$, where M is a sample of the main composite signal above 1.5 MHz, and A is a sample of the auxiliary modulated signal.

With intraframe averaging V-T crosstalk is virtually eliminated, even in the presence of motion. In this regard, the process of intraframe averaging produces identical samples 262H apart. At the receiver it is a simple matter to recover the information content of these samples exactly, i.e., free from crosstalk, by processing pixel samples 262H apart within a frame as will be discussed, thereby recovering main and auxiliary signal information. At a decoder in the receiver, the intraframe averaged original information can be recovered substantially intact via intraframe processing since the original highly visually correlated information has been made substantially identical field-to-field.

Also at the receiver, the RF channel is quadrature demodulated using a synchronous RF detector. Component 4 is thereby separated from the other three components. Intraframe processing is used to separate component 1 from modulated components 2 and 3, and quadrature demodulation is used to separate components 2 and 3, as will be discussed with regard to FIG. 4.

After the four components have been recovered, the composite signals are NTSC decoded and separated into luminance and chrominance components. Inverse mapping is performed on all components to recover the widescreen aspect ratio, and the side panel highs are combined with the lows to recover full side panel resolution. The extended high frequency luminance detail information is shifted to its original frequency range and added to the luminance signal, which is converted to the progressive scan format using temporal interpolation and the helper signal. The chrominance signal is converted to progressive scan format using unassisted temporal interpolation. Finally, the luminance and chrominance progressive scan signals are converted to analog form and matrixed to produce RGB color image signals for display by a widescreen progressive scan display device.

The widescreen EDTV system is shown in greater detail in FIG. 1a. Referring to FIG. 1a, a 515 line 60 field/sec. widescreen progressive scan camera 10 provides a widescreen color signal with R, G, B components and a wide aspect ratio of 5:3 in this example. An interlaced signal source could also be used, but a progressive scan signal source produces superior results. A widescreen camera has a greater aspect ratio and a greater video bandwidth compared to a standard NTSC camera, the video bandwidth of a widescreen camera being proportional to the product of its aspect ratio and the total number of lines per frame, among other factors. Assuming constant velocity scanning by the widescreen camera, an increase in its aspect ratio causes a corresponding increase in its video bandwidth as well as horizontal compression of picture information when the signal is displayed by a standard television receiver with a 4:3 aspect ratio. For these reasons, it is necessary to modify the widescreen signal for full NTSC compatibility.

The color video signal processed by the encoder system of FIG. 1 contains both luminance and chrominance signal components. The luminance and chrominance signals contain both low and high frequency information, which in the following discussion will be referred to as "lows" and "highs", respectively.

The wide bandwidth widescreen progressive scan color video signals from camera 10 are matrixed in a unit 12 to derive luminance component Y and color difference signal components I and Q from the R, G, B color signals. Wideband progressive scan signals Y, I, Q are sampled at an eight-times chrominance subcarrier rate (8×fsc), and are converted from analog-to-digital converters (ADC) in an ADC unit 14 before being filtered individually by separate vertical-temporal (V-T) low pass filters in a filter unit 16 to produce filtered signals YF, IF and QF. The separate filters are 3×3 linear time invariant filters. These filters reduce vertical-temporal resolution slightly, particularly diagonal V-T resolution, to prevent unwanted interlace artifacts (such as flicker, jagged edges, and other aliasing related effects) in the main signal (component 1 in FIG. 1) after progressive scan to interlace conversion. The filters maintain nearly full vertical resolution in stationary portions of the image.

The center panel expansion factor (CEF) is a function of the difference between the width of an image displayed by a widescreen receiver and the width of an image displayed by a standard receiver. The image width of a widescreen display with a 5:3 aspect ratio is 1.25 times greater than the image width of a standard display with a 4:3 aspect ratio. This factor of 1.25 is a preliminary center panel expansion factor which must be adjusted to account for the overscan region of a standard receiver, and to account for an international slight overlap of the boundary regions between the center and side panels as will be explained. These considerations dictate a CEF of 1.19.

The progressive scan signals from filter network 16 exhibit a bandwidth of 0–14.32 MHz and are respectively converted into 2:1 interlaced signals by means of progressive scan (P) to interlace (I) converters 17a, 17b and 17c. The bandwidth of output signals IF', QF' and YF' from converters 17a–17c exhibit a bandwidth of 0–7.16 MHz since the horizontal scanning rate for interlaced signals is half that of progressive scan signals. In the conversion process, the progressive scan signal is subsampled, taking half the available pixel samples to produce the 2:1 interlaced main signal. Specifically, each progressive scan signal is converted to 2:1 interlaced format by retaining either the odd or even lines in each field and reading out the retained pixels at a 4×fsc rate (14.32 MHz). All subsequent digital processing of the interlaced signals occurs at the 4×fsc rate.

Network 17c also includes an error prediction network. One output of network 17c, YF', is the interlaced subsampled luminance version of the prefiltered progressive scan component. Another output (luminance) signal of network 17c, YT, comprises temporal information derived from image field difference information and represents a temporal prediction, or temporal interpolation, error between actual and predicted values of luminance samples "missing" at the receiver, as will be explained. The prediction is based on a temporal average of the amplitudes of "before" and "after" pixels, which are available at the receiver. Signal YT, a luminance "helper" signal that assists to reconstruct the progressive scan signal at the receiver, essentially accounts for an error that the receiver is expected to make with respect to non-stationary image signals and facilitates cancellation of such error at the receiver. In stationary portions of an image the error is zero, and perfect reconstruction is performed at the receiver. It has been found that a chrominance helper signal is not needed as a practical matter, and that a luminance helper signal is sufficient to produce good results since the human eye is less sensitive to a lack of chrominance vertical or temporal detail. Interlaced widescreen signals IF', QF' and YF' from converters 17a–17c are respectively filtered by horizontal lowpass filters 19a, 19b and 19c to produce a signal IF" with a bandwidth of 0–600 KHz, a signal QF" with a bandwidth of 0–600 KHz, and a signal YF" with a bandwidth of 0–5 MHz. These signals are next subjected to a format encoding process which encodes each of these signals into a 4:3 format by means of format encoding apparatus associated with a side-center signal separator and processor unit 18. Briefly, the center portion of each widescreen line is time-expanded and mapped into the displayed portion of the active line time with a 4:3 aspect ratio. Time expansion causes a decrease in bandwidth so that the original widescreen interlaced frequencies are made compatible with the standard NTSC bandwidth. The side panels are split into horizontal frequency bands so that the I and Q color highs component exhibit a bandwidth of 83 KHz–600 KHz and the Y luminance highs component exhibits a bandwidth of 700 KHz–5.0 MHz. The side panel lows, i.e., signals Y0, I0 and Q0, include a DC component and are time-compressed and mapped into the left and right horizontal image overscan regions on each line. The side panel highs are processed separately. Details of this format encoding process follow immediately below.

Figure 1E:
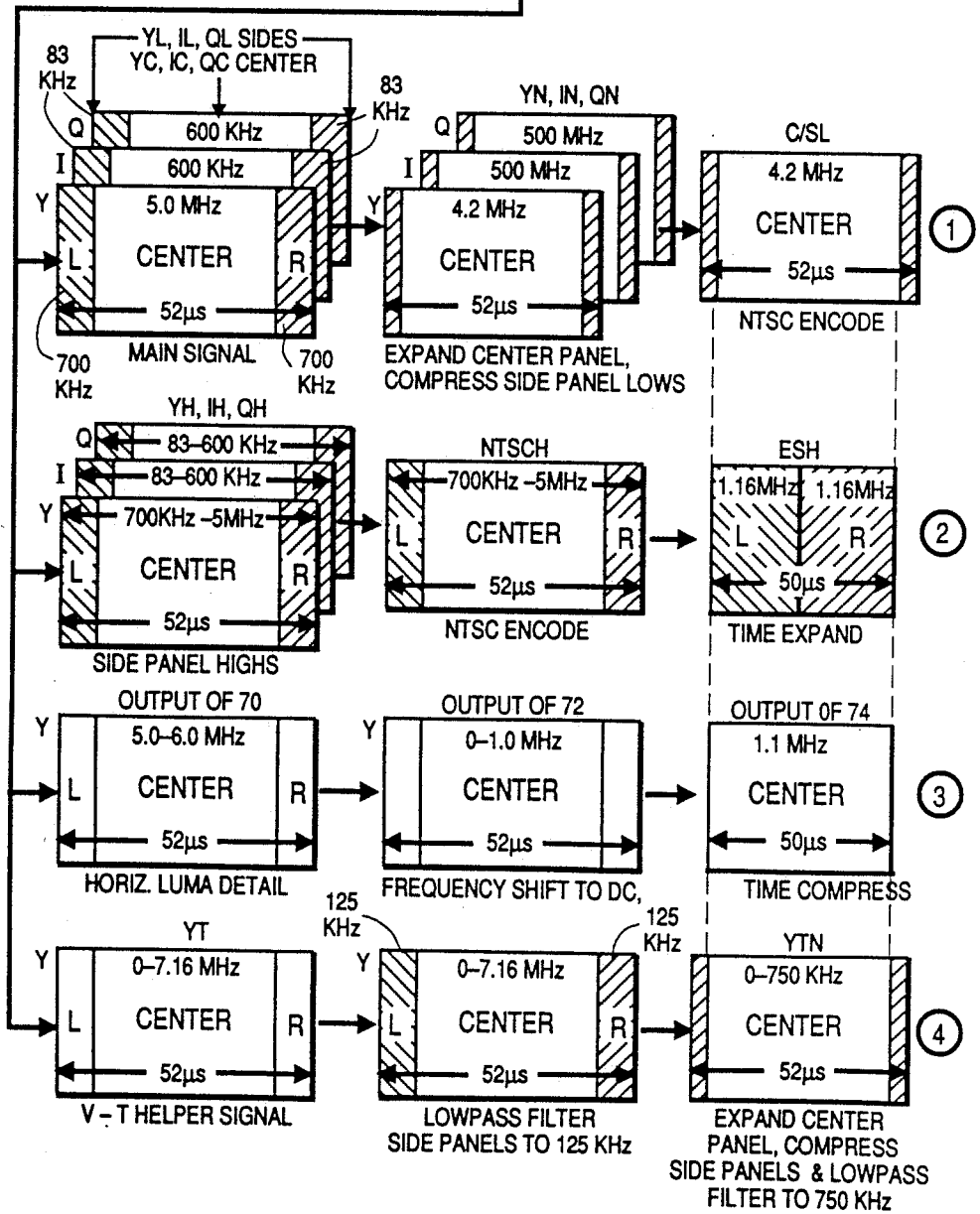

In the course of considering the following encoding details, it will be helpful to also consider FIG. 1e, which depicts the process of encoding components 1, 2, 3 and 4 in the context of displayed center and side panel information. Filtered interlaced signals IF''', QF''' and YF''' are processed by side-center panel signal separator and processor 18 to produce three groups of output signals: YE, IE and QE; YO, IO and QO; and YH, IH and QH. The first two groups of signals (YE, IE, QE and YO, IO, QO) are processed to develop a signal containing a full bandwidth center panel component, and side panel luminance lows compressed into horizontal overscan regions. The third group of signals (YH, IH, QH) is processed to develop a signal containing side panel highs. When these signals are combined, an NTSC compatible widescreen signal with a 4:3 display aspect ratio is produced.

Signals YE, IE and QE contain complete center panel information and exhibit the same format. Briefly, signal YE is derived from signal YE" as follows. Widescreen signal YF" contains pixels 1–754 occuring during the active line interval of the widescreen signal, containing side and center panel information. The wideband center panel information (pixels 75–680) is extracted as a center panel luminance signal YC via a time de-multiplexing process. Signal YC is time expanded by the center panel expansion factor of 1.19 (i.e., 5.0 MHz÷4.2 MHz) to produce NTSC compatible center panel signal YE. Signal YE exhibits an NTSC compatible bandwidth (0.4.2 MHz) due to the time expansion by factor 1.19. Signal YE occupies the picture display interval between the overscan regions. Signals IE and QE are developed from signals IF" and QF", respectively, and are similarly processed in the manner of signal YE.

Signals YO, IO and QO provide the low frequency side panel information ("lows") which is inserted into the left and right horizontal overscan regions. Signals YO, IO and QO exhibit the same format. Briefly, signal YO is derived from signal YF" as follows. Widescreen signal YF contains left panel information associated with pixels 1-84 and right panel information associated with pixels 671-754. As will be discussed, signal YF" is low pass filtered to produce a luminance lows signal with a 0-700 KHz bandwidth, from which signal a left and right side panel lows signal is extracted (signal YL' via a time de-multiplexing process. Luminance lows signal YL' is time compressed to produce side panel lows signal YO with compressed low frequency information in the overscan regions associated with pixels 1-14 and 741-754. The compressed side lows signal exhibits an increased bandwidth proportional to the amount of time compression. Signals IO and QO are developed from signals IF" and QF" respectively, and are similarly processed in the manner of signal YO.

Signals YE, IE, QE and YO, IO, QO are combined by a side-center signal combiner 28, e.g. a time multiplexer, to produce signals YN, IN and QN with an NTSC compatible bandwidth and a 4:3 aspect ratio. Combiner 28 also includes appropriate signal delays for equalizing the transit times of the signals being combined. Such equalizing signal delays are also included elsewhere in the system as required to equalize signal transit times.

A modulator 30, bandpass filter 32, H-V-T bandstop filter 34 and combiner 36 constitute an improved NTSC signal encoder 31. Chrominance signals IN and QN are quadrature modulated on a subcarrier SC at the NTSC chrominance subcarrier frequency, nominally 3.58 MHz, by modulator 30 to produce a modulated signal CN. Modulator 30 is of conventional design. Modulated signal CN is bandpass filtered in the vertical (V) and temporal (T) dimensions by means of two-dimensional (V-T) filter 32, which removes crosstalk artifacts in the interlaced chrominance signal before it is applied to a chrominance signal input of combiner 36 as a signal CP. Luminance signal YN is bandstop filtered in the horizontal (H), vertical (V) and temporal (T) dimensions by means of three-dimensional H-V-T bandstop filter 34 before being applied, as a signal YP, to a luminance input of combiner 36. Filtering luminance signal YN and chrominance color difference signals IN and QN serves to assure that luminance-chrominance crosstalk will be significantly reduced after subsequent NTSC encoding.

H-V-T bandstop filter 34 removes upwardly moving diagonal frequency components from luminance signal YN. These frequency components are similar in appearance to chrominance subcarrier components and are removed to make a hole in the frequency spectrum into which modulated chrominance will be inserted. The removal of the upwardly moving diagonal frequency components from luminance signal YN does not visibly degrade a displayed picture because it has been determined that the human eye is substantially insensitive to these frequency components. Filter 34 exhibits a cut-off frequency of approximately 1.5 MHZ so as not to impair luminance vertical detail information.

V-T bandpass filter 32 reduces the chrominance bandwidth so that modulated chrominance side panel information can be inserted into the hole created in the luminance spectrum by filter 34. Filter 32 reduces the vertical and temporal resolution of chrominance information such that static and moving edges are slightly blurred, but this effect is of little or no consequence due to the insensitivity of the human eye to such effect.

An output center/side lows signal C/SL from combiner 36 contains NTSC compatible information to be displayed, as derived from the center panel of the widescreen signal, as well as compressed side panel lows (both luminance and chrominance) derived from the side panels of the widescreen signal and situated in the left and right horizontal overscan regions not seen by a viewer of an NTSC receiver display. The compressed side panel lows in the overscan region represent one constituent part of the side panel information for a widescreen display. The other constituent part, the side panel highs, is developed by processor 18 as will be discussed below.

The center panel portion of signal C/SL is processed by an intraframe averager 38 to produce a signal N, which is applied to an input of an adder 40. Intraframe averaged signal N is essentially identical to signal C/SL because of the high visual correlation of intraframe image information of signal C/SL. Averager 38 averages signal C/SL above approximately 1.5 MHz and assists to reduce or eliminate vertical-temporal crosstalk between the main and auxiliary signals, and also provides vertical peaking of signal frequencies subjected to intraframe averaging to enhance vertical resolution of an image representative signal produced at a decoder in a receiver. The highpass frequency range of 1.5 MHz and above over which intraframe averager 38 operates was chosen to assure that full intraframe averaging is accomplished for information at 2 MHz and above, to prevent luminance vertical detail information from being degraded by the process of intraframe averaging. Horizontal crosstalk is eliminated by means of a 200 kHz guardband between a filter associated with intraframe averager 38 in encoder 31 and a filter associated with an intraframe processor unit in the decoder of FIG. 4. The process of intraframe averaging with vertical peaking alternatively could have been performed in the luminance path alone between blocks 34 and 36, i.e., before the luminance and chrominance components are combined, or in the luminance LPF portion of networks 16.

Signals, IH, QH, and YH are placed in NTSC format by means of an NTSC encoder 60 which is similar to encoder 31. Specifically, encoder 60 includes apparatus for quadrature modulating side panel chrominance highs information onto the side panel luminance highs information at 3.58 MHz, to produce signal NTSCH, the side panel highs information in NTSC format.

The use of multi-dimensional bandpass filtering in NTSC encoders 31 and 60 advantageously permits the luminance and chrominance components to be separated virtually free of crosstalk at the receiver when the receiver includes complementary multi-dimensional filtering for separating the luminance and chrominance information. The use of complementary filters for luminance/chrominance encoding and decoding is called cooperative processing and is discussed in detail in an article by C. H. Strolle titled "Cooperative processing for Improved Chrominance/Luminance Separation", published in the SMPTE Journal, Vol. 95, No. 8, August 1986, pp. 782-789. Even standard receivers using conventional notch and line-comb filters will benefit from the use of such multi-dimensional pre-filtering at the encoder by exhibiting reduced chrominance/luminance crosstalk.

Signal NTSCH is time expanded by a unit 62 to produce an expanded side highs signal ESH with a 50 $\mu$s active horizontal line interval, i.e., less than the standard NTSC active line interval of approximately 52 $\mu$s. Specifically, the expansion is accomplished by a "mapping" process which maps left side panel pixels 1-84 of signal NTSCH into pixel positions 15-377 of signal ESH, i.e., the left side highs of a signal NTSCH are expanded to occupy approximately one half the line time of signal ESH. The right side panel portion (pixels 671-754) of signal NTSCH is similarly processed. The time expansion process reduces the horizontal bandwidth of the information comprising signal ESH (compared to that of signal NTSCH) by a factor of 363/84. Signal ESH is infra-frame averaged and vertically peaked by a network 64 to produce a signal X. Intraframe averaged signal X is essentially identical to signal ESH because of the high visual correlation of intraframe image information of signal ESH. Signal X is applied to a signal input of a quadrature modulator 80.

Signal YF' is also filtered by a horizontal bandpass filter 70 with a passband of 5 MHz-6.0 MHz. The output signal from filter 70, horizontal luminance highs, is applied to an amplitude modulator 72 where it amplitude modulates a 5 MHz carrier signal $f_c$. Modulator 72 includes an output low pass filter with a cut-off frequency of approximately 1.0 MHz to obtain a signal with a 0-1.0 MHz passband at the output of modulator 72. The upper (aliased) sideband (5.0-6.0 MHz) produced by the modulation process is removed by the 1.0 MHz lowpass filter. Effectively, horizontal luminance highs frequencies in the range 5.0 MHz-6.0 MHz have been shifted to the range 0-1.0 MHz as a result of the amplitude modulation process and subsequent low pass filtering. The carrier amplitude should be large enough so that the original signal amplitudes are retained after filtering by the 1.0 MHz low pass filter. That is, a frequency shift without affecting amplitude is produced.

The frequency-shifted horizontal luminance highs signal from unit 72 is encoded (time compressed) by means of a format encoder 74. That is, encoder 74 encodes the frequency shifted horizontal luminance highs so that this signal exhibits an active line interval of 50 μs, less than the standard NTSC active line interval of 52.6 μs. When the input signal to encoder 74 is time compressed by encoder 74, its bandwidth increases from approximately 1.0 MHz to 1.1 MHz at the output of encoder 74. The signal from encoder 74 is intraframe averaged and vertically peaked by means of apparatus 76 before being applied to unit 80 as signal Z. Intraframe averaged signal Z is essentially identical to the signal from encoder 74 because of the high visual correlation of intraframe image information of the signal from encoder 74. Modulating signal X, a composite signal containing luminance and chrominance information, and modulating signal exhibit substantially the same bandwidth, approximately 0-1.1 MHz.

Unit 80 performs nonlinear gamma function amplitude compression on large amplitude excursions of the two auxiliary signals, X and Z, before these signals quadrature modulate an auxiliary subcarrier signal ASC. A gamma of 0.7 is used, whereby the absolute value of each sample is raised to the 0.7 power and multiplied by the signal of the original sample value. Gamma compression reduces the visibility of potentially interfering large amplitude excursions of the modulated signals on existing receivers, and allows predictable recovery at the widescreen receiver since the inverse of the gamma function employed at the encoder is predictable and can be readily implemented at the receiver decoder.

The amplitude compressed signals are then quadrature modulated on a 3.1075 MHz phase-controlled auxiliary subcarrier ASC, which is an odd multiple of one half the horizontal line frequency (395×H/2). The phase of the auxiliary subcarrier is caused to auxiliary 180° from one field to the next, unlike the phase of the chrominance subcarrier. The field alternating phase of the auxiliary subcarrier permits the auxiliary modulating information of signals X and Z to overlap chrominance information and produces complementary phased auxiliary information components A1, −A1 and A3, −A3 of the modulated auxiliary signal, which facilitates the separation of the auxiliary information using a relatively uncomplicated field storage device at the receiver. The quadrature modulated signal, M, is added to signal N in adder 40. The resulting signal, NTSCF, is a 4.2 MHz NTSC compatible signal.

The described non-linear gamma function employed in the encoder for the purpose of large amplitude compression is a constituent part of a non-linear companding (compression-expansion) system which also includes a complementary gamma function in the decoder of a widescreen receiver for the purpose of amplitude expansion, as will be discussed subsequently. The disclosed non-linear companding system has been found to significantly reduce the impact of auxiliary non-standard information upon the standard information, without causing visible degradation of an image due to noise effects. The companding system uses a non-linear gamma function to instantaneously compress large amplitude excursions of auxiliary, non-standard widescreen high frequency information at the encoder, with a complementary non-linear gamma function being used to correspondingly expand such high frequency information at the decoder. The result is a reduction in the amount of interference with existing standard video information caused by large amplitude auxiliary high frequency information, in the disclosed compatible widescreen system wherein non-standard auxiliary widescreen information is split into low and high frequency portions subjected to companding. At the decoder, non-linear amplitude expansion of the compressed high frequency information does not result in excessive perceived noise since large amplitude high frequency information is typically associated with high contrast image edges, and the human eye is insensitive to noise at such edges. The described companding process also advantageously reduces cross-modulation products between the auxiliary and chrominance subcarriers, with associated reduction in visible beat products.

Luminance detail signal YT exhibits a bandwidth of 7.16 MHz and is encoded into the 4:3 format by means of a format encoder 78, and is horizontally lowpass filtered to 750 KHz by a filter 79 to produce a signal YTN. The side portions are lowpass filtered to 125 KHz before time compression by means of a n input lowpass filter of format encoder 78 with a cut-off frequency of 125 KHz. The side portion highs are discarded. Thus signal YTN is spatially correlated with main signal C/SL.

Signals YTN and NTSCF are converted from digital (binary) to analog form by means of DAC units 53 and 54 respectively, before these signals are applied to an RF quadrature modulator 57 for modulating a TV RF carrier signal. The RF modulated signal is afterwards applied to a transmitter 55 for broadcast via an antenna 56.

Auxiliary subcarrier ASC associated with modulator 80 is horizontally synchronized and has a frequency chosen to insure adequate separation (e.g., 20-30 db.) of side and center information, and to have insignificant impact upon an image displayed by a standard NTSC receiver. The ASC frequency preferably should be an interlace frequency at an odd multiple of one half the horizontal line rate so as not produce interference which would compromise the quality of a displayed picture.

Quadrature modulation such as provided by unit 80 advantageously permits two narrow band signals to be transmitted simultaneously. Time expanding the modulating high signals results in a bandwidth reduction, consistent with the narrowband requirements of quadrature modulation. The more the bandwidth is reduced, the less likely it is that interference between the carrier and modulating signals will result. Furthermore, the typically high energy DC component of the side panel information is compressed into the overscan region rather than being used as a modulating signal. Thus the energy of the modulating signal, and therefore the potential interference of the modulating signal, are greatly reduced.

Figure 4:
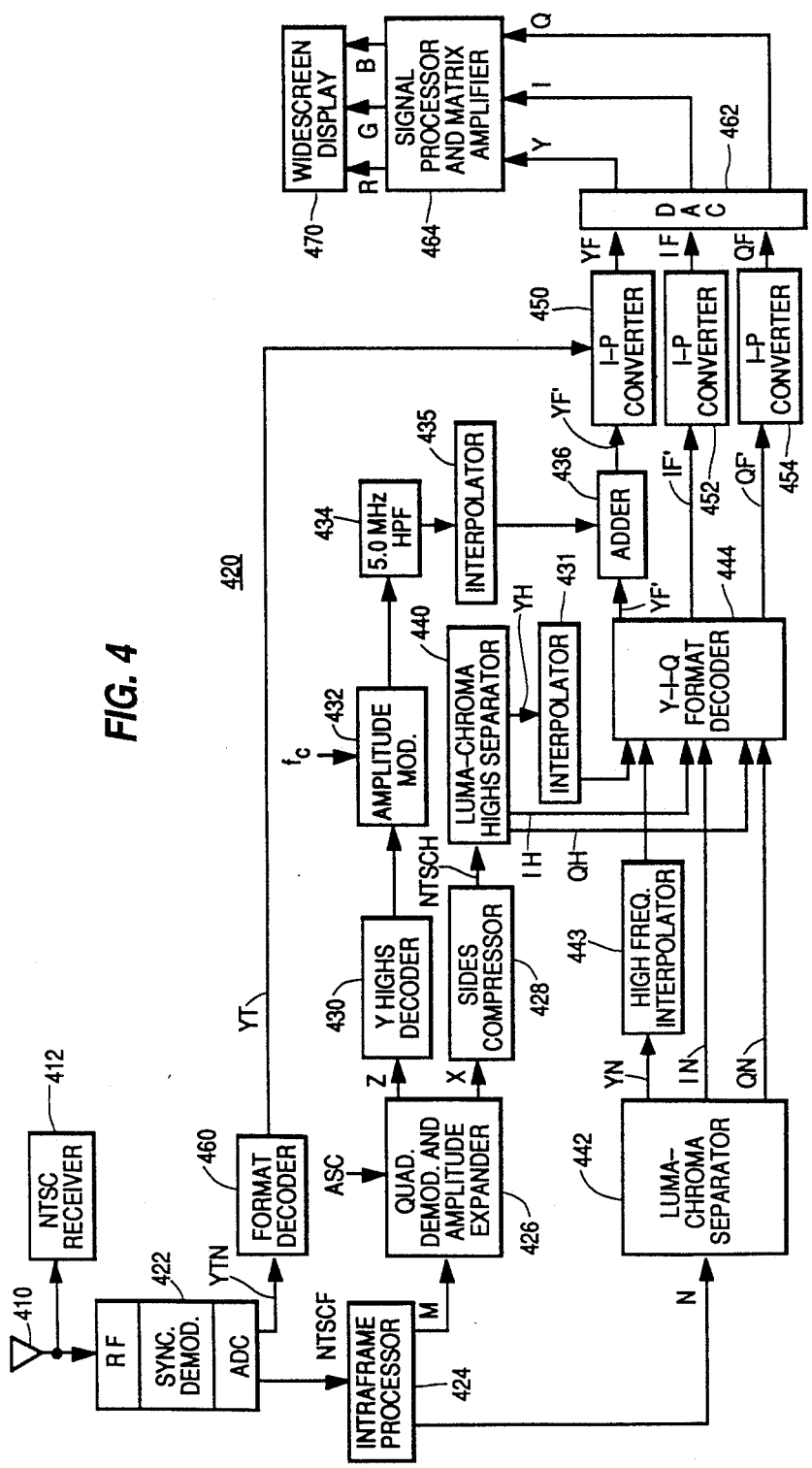
FIG. 4 shows a block diagram of a portion of widescreen EDTV receiver decoder including apparatus according to the present invention.

The encoded NTSC compatible widescreen signal broadcast by antenna 56 is intended to be received by both NTSC receivers and widescreen receivers, as illustrated by FIG 4.

In FIG. 4, a broadcast compatible widescreen EDTV interlaced television signal is received by an antenna 410 and applied to an antenna input of an NTSC receiver 412. Receiver 412 processes the compatible widescreen signal in normal fashion to produce an image display with a 4:3 aspect ratio, with the widescreen side panel information being in part compressed (i.e., "lows") into the horizontal overscan regions out of sight of the viewer, and being in part (i.e., "highs") contained in the modulated auxiliary subcarrier signal which does not disrupt the standard receiver operation.

The compatible widescreen EDTV signal received by antenna 410 is also applied to a widescreen progressive scan receiver 420 capable of displaying a video image with a wide aspect ratio of, e.g., 5:3. The received widescreen signal is processed by an input unit 422 including radio frequency (RF) tuner and amplifier circuits, a synchronous video demodulator (a quadrature demodulator) which produces a baseband video signal, and analog-to-digital (ADC) converter circuits for producing a baseband video signal (NTSCF( in binary form. The ADC circuits operate at a sampling rate of four times the chrominance subcarrier frequency (4×fsc.).

Signal NTSCF is applied to an intraframe processor 424 which processes image lines 262H apart within frames above 1.7 MHz, to recover main signal N and quadrature modulated auxiliary signal M substantially free from V-T crosstalk. A 200 KHz horizontal crosstalk guardband is provided between the 1.7 MHz lower limit operating frequency of unit 424 and the 1.5 MHz lower limit operating frequency of unit 38 in the encoder of FIG. 1a. Recovered signal N contains information of main signal C/SL, due to the high visual intraframe image correlation of original main signal C/SL as intraframe averaged in the encoder of FIG. 1a.

Signal M is coupled to a quadrature demodulator and amplitude expander unit 426 for demodulating auxiliary signals X and Z in response to an auxiliary subcarrier ASC with a field alternating phase, similar to signal ASC discussed in connection with FIG. 1a. Demodulated signals X and Z contain information which is essentially visually identical to image information of signal ESH and of the output signal from unit 74 in FIG. 1a, due to the high visual intraframe image correlation of these signals as intraframe averaged by the encoder of FIG. 1a. Unit 426 also includes a 1.5 MHz lowpass filter to remove unwanted high frequency demodulation products at twice the auxiliary subcarrier frequency, and an amplitude expander for expanding the (previously compressed) demodulated signals using an inverse-gamma function (gamma=1/0.7=1.429), i.e., the inverse of the non-linear compression function performed by unit 80 in FIG. 1a.

A unit time compresses the color encoded side panel highs so that they occupy their original time slots, thereby recovering signal NTSCH. Unit 428 time compresses signal NTSCH by the same amount that unit 62 of FIG. 1a expanded signal NTSCH.

A luminance (Y) highs decoder 430 decodes luminance horizontal highs signal Z into widescreen format by time expanding this signal by the same amount as time compression of the corresponding component in the encoder of FIG. 1a, using mapping techniques described herein.

Figure 5:
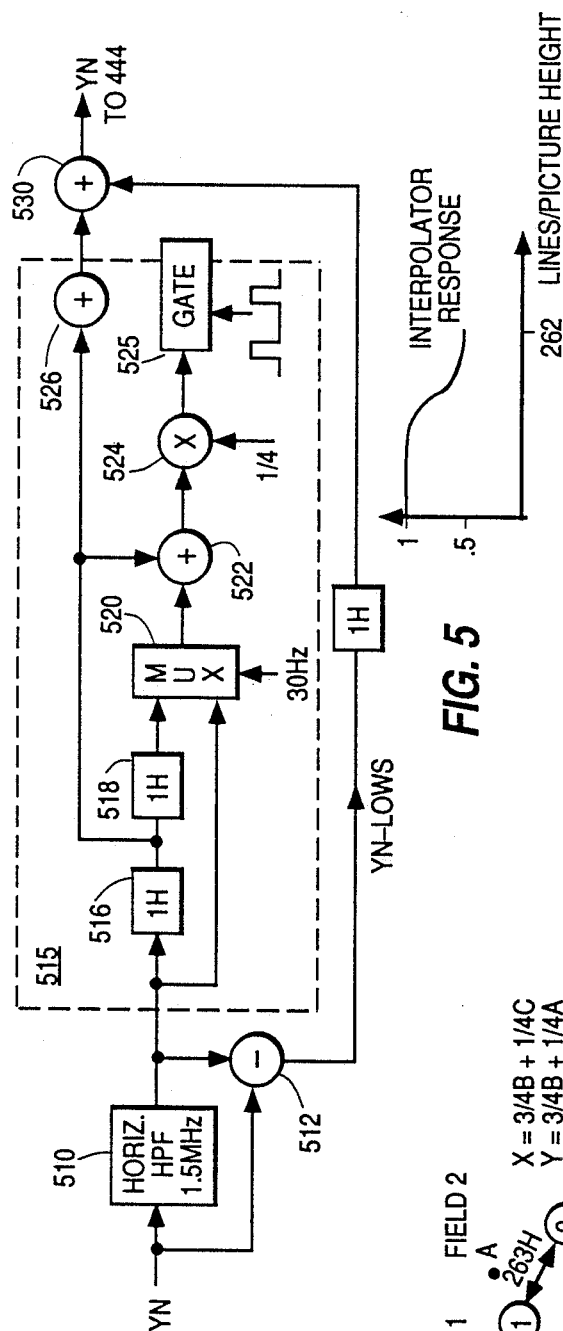

Modulator 432 amplitude modulates the signal from decoder 430 on a 5.0 MHz carrier $f_c$. The amplitude modulated signal is afterwards high pass filtered by a filter 434 with a 5.0 Mhz cut-off frequency to remove the lower sideband. In the output signal from filter 434, center panel frequencies of 5.0 to 6.0 Mhz are recovered, and side panel frequencies of 5.0 to 6.0 MHz are recovered. The signal from filter 434 is applied to an adder 436 via an interpolator 435 corresponding to interpolator 515 as shown in FIG. 5 to be discussed, for reducing jagged diagonal artifacts.

Signal NTSCH from compressor 428 is applied to a unit 440 for separating the luminance highs from the chrominance highs to produce signals YH, IH and QH. Signal YH is processed by an interpolator 441 also corresponding to interpolator 515 of FIG. 5, for reducing jagged diagonal artifacts.

Signal N from unit 424 is separated into its constituent luminance and chrominance components YN, IN and QN by means of a luminance-chrominance separator 442 which cab be similar to separator 440.

The process of intraframe averaging (a relatively simple form of vertical filtering) performed at the encoder can produce unwanted jagged diagonal artifacts (e.g., stairstep-like serrations) particularly in areas of pronounced light-dark image transitions. The visibility of these artifacts is significantly reduced by means of interpolator 443, which operates on the luminance high frequency information above 1.5 MHz which was subjected to intraframe averaging via unit 38 at the encoder. Interpolator 443 tends to decrease vertical resolution slightly. However, this effect is compensated for by the use of vertical peaking in association with intraframe averager 38 in the encoder. The nature of the line interpolation process performed by interpolator 443 is indicated by the diagram of FIG. 6.

Figure 6:
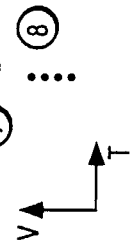

FIG. 6 illustrates a portion of the interlaced line structure for first and second successive image fields. Field 1 contains odd-numbered lines 1,3,5,7 . . . , and field 2, 262H apart from field 1, contains even-numbered lines 2,4,6,8 etc. The process of intraframe averaging at block 38 of the encoder is essentially an interpolative process which develops average values indicated by points A, B, C, D. At the encoder, average value A is assigned to line 1 of field 1, average value B is assigned to line in field 1 and to line 2 ("y") in field 2, average value C is assigned to line 5 in field 1 and to line 4 in field 2, and so on. As a result of the intraframe averaging performed at the encoder, pixels in fields 262H apart have equal values. Lines 3-2, 5-4, 7-6 etc. are 262H apart, while lines 1-2, 3-4, 5-6 etc. are 263H apart. The values are average values in this illustration, but other values could be selected depending on the requirements of a given system.

An aliasing effect resulting in a jagged diagonal artifact results when intraframe averaged high frequency center panel information, and luminance information in particular, associated with a diagonal image transition is combined with non-intraframe averaged low frequency information. The jagged diagonal artifacts are reduced by employing the following linear interpolation formulas for fields 1 and 2 with a given frame:

$X = \frac{3}{4}B + \frac{1}{4}C$  (field 1)

$y = \frac{1}{4}A + \frac{3}{4}B$  (field 2)

This the interpolation process modifies the originally determined intraframe averaged value of the lines in each field, by assigning them new values in accordance with the interpolation formulas above. The interpolation process can also operate on intraframe averaged chrominance information. This is not considered necessary in all cases, however, because chrominance "jaggies" are considered to be less objectionable from a psycho-visual standpoint.

Signals YH, IH, QH and IN, QN, YN (after interpolation) are provided as inputs to a Y-I-Q format decoder 444, which decodes the luminance and chrominance components into widescreen format. The side panel lows are time expanded, the center panel is time compressed, the side panel highs are added to the side panel lows, and the side panels are spliced to the center panel in the 10-pixel overlap region.

Signal YF' is coupled to adder 436 where it is summed with the signal from filter 434. By this process recovered extended high frequency horizontal luminance detail information is added to decoded luminance signal YF'.

Signals YF', IF' and QF' are converted from interlaced to progressive scan format by means of converters 450, 452 and 454, respectively. Luminance progressive scan converter 450 also responds to "helper" luminance signal YT from a format decoder 460, which decodes encoded "helper" signal YTN. Decoder 460 decodes signal YTN into widescreen format.

I and Q converters 452 and 454 convert interlace to progressive scan signals by temporally averaging lines one frame apart to produce the missing progressive scan line information.

Luminance progressive scan converter unit 1350 is similar except that signal YT is added. In this unit a "helper" signal sample, YT, is added to a temporal average to assist reconstructing a missing progressive scan pixel sample. Full temporal detail is recovered within the band of horizontal frequencies contained in the encoded line difference signal (750 KHz, after encoding). Above this band of horizontal frequencies signal YT is zero, so the missing sample is reconstructed by temporal averaging.

Widescreen progressive scan signals YF, IF and QF are converted to analog form means of a digital-to-analog converter 462 before being applied to a video signal processor and matrix amplifier unit 464. The video signal processor component of unit 464 includes signal amplifying, DC level shifting, peaking, brightness control, contrast control and other conventional video signal processing circuits. Matrix amplifier 463 combines luminance signal YF with color deference signals IF and QF to produce color image representative video signals R, G and B. These color signals are amplified by display driver amplifiers in unit 464 to a level suitable for directly driving a widescreen color image display device 470, e.g. a widescreen kinescope.

Figure 2:
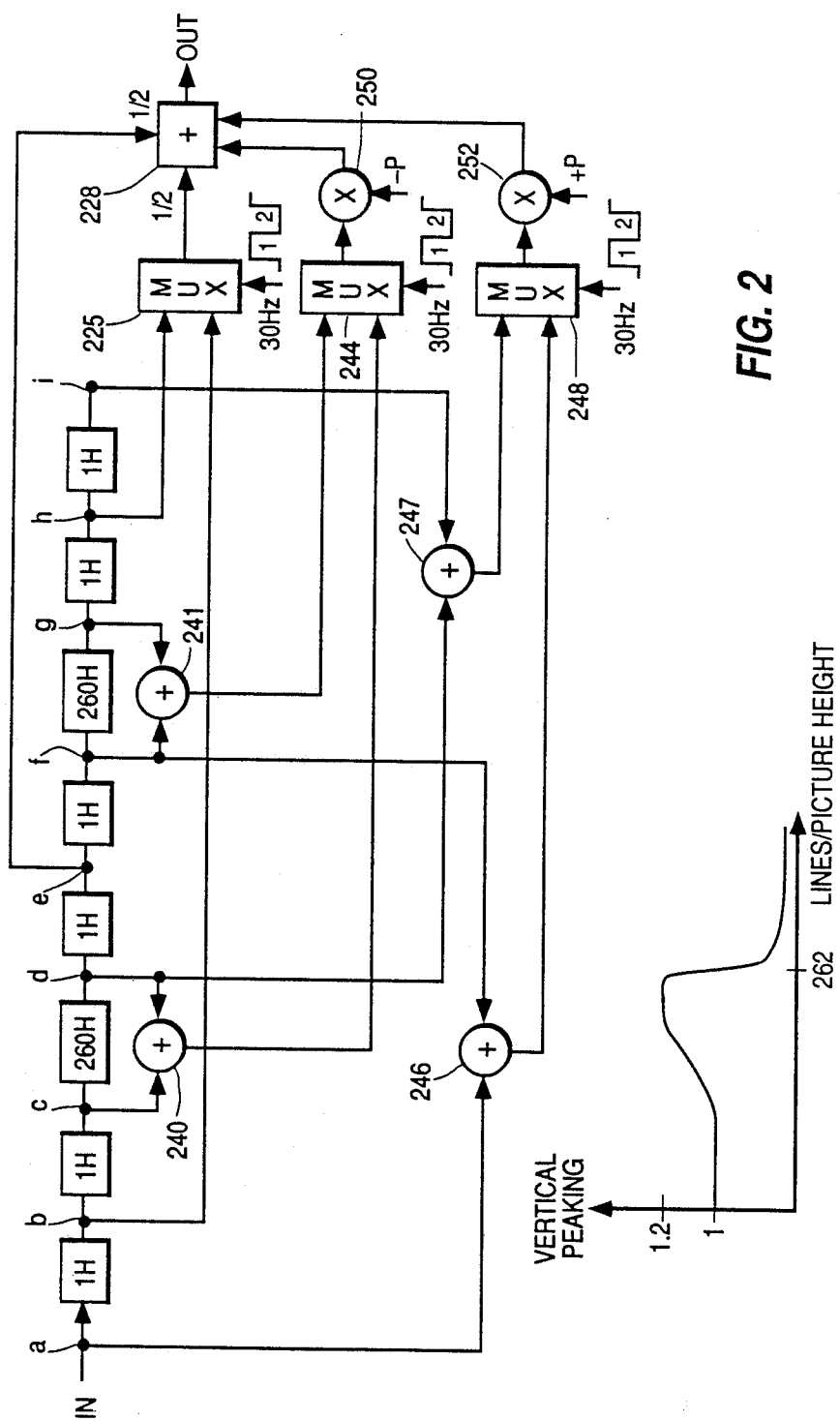
FIGS. 2-3 and 5-6 illustrate aspects of the disclosed system in greater detail.

FIG. 2 depicts an intraframe averager, with vertical peaking and vertical lowpass filtering, suitable for use as intraframe averagers 64 and 76 of FIG. 1a. The arrangement of FIG. 2, with the exception of the peaking feature, is similar to an intraframe averaging arrangement disclosed in a copending U.S. patent application Ser. No. 215,123 of T. R. Smith et al., titled "Frequency Selective Video Signal Intraframe Processor". The apparatus of FIB. 2 includes a plurality of cascaded 1H and 260 H delay elements with associated terminals a-i as shown. Delayed signals from terminals c and d, and delayed signals from terminals f and g, are respectively summed by elements 240 and 241 which provide respective outputs to separate inputs of a multiplexer (MUX) 244 which is switched at the field rate in response to a 30 Hz switching signal. A MUX 248 receives combined output signals from combiners 246 and 247 which respectively sum signals from terminals a, f and d, i. A MUX 225 receives signals from terminals b and h directly. Output signals from MUX 244 and MUX 248 are applied to multipliers 250 and 252 which receive complementary peaking signals +P and −P, respectively, for producing peaked output signals which are applied to output combiner 228, which also receives signals from MUX 225 and from delay center tap terminal e. The vertical peaking characteristic of the apparatus of FIG. 2 is as illustrated. The output of this intraframe processor for pixels in field 1 is a combination of three pixels above the center tap, the center tap, and two pixels below the center tap. For field 2 there are two pixels above the center tap and three pixels below the center tap. This transversal filter has an even number of taps.

Figure 3:
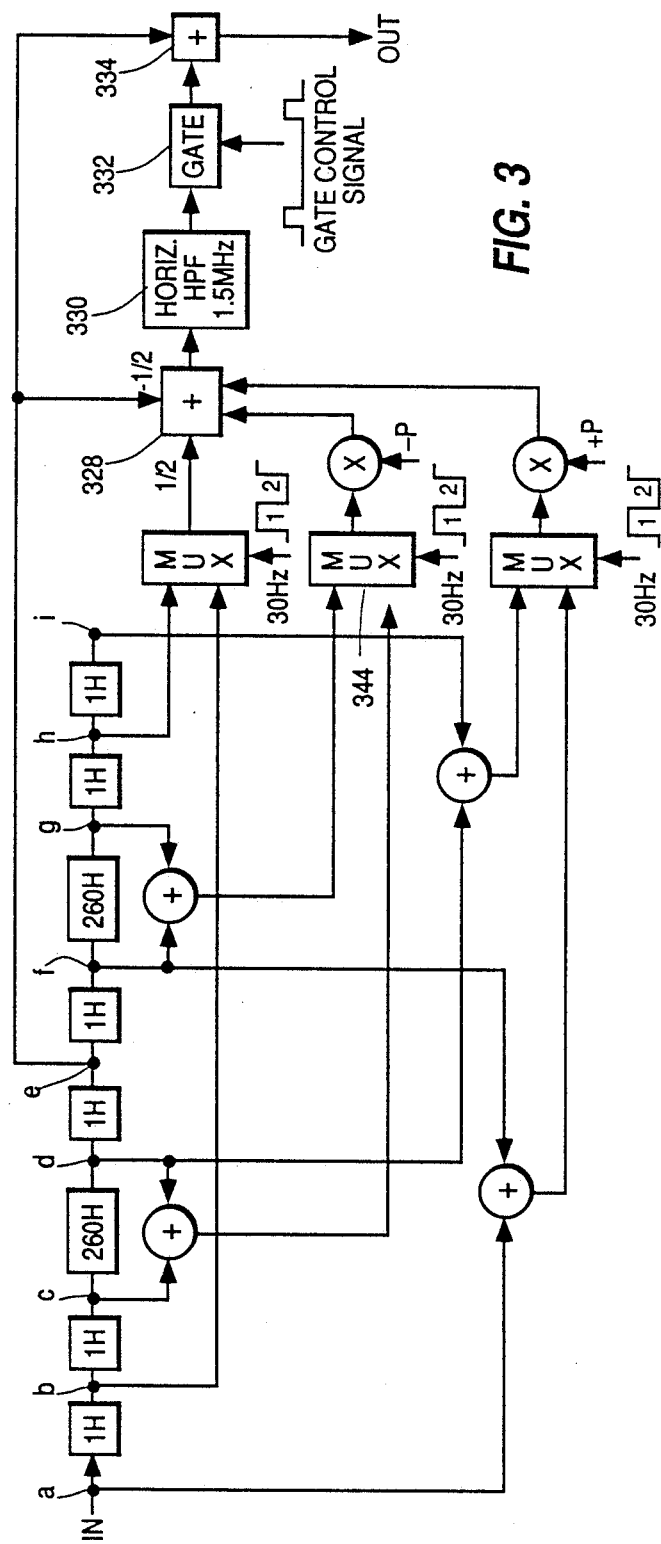

FIG. 3 illustrates a frequency selective intraframe averager, with vertical peaking and vertical lowpass filtering, suitable for use as intraframe averager 38 of FIG. 1a. The arrangement of FIG. 3, with the exception of the peaking feature, also is similar to a frequency selective intraframe averaging arrangement disclosed in the aforementioned Smith, et al. copending U.S. patent application.

The apparatus of FIG. 3 is identical to that of FIG. 2, except that elements 330, 332 and 334 have been added, and that combiner 328 combines signals weighted by $+\frac{1}{2}$ and $-\frac{1}{2}$ factors. The output signal from combiner 328 is filtered by 1.5 MHz horizontal high pass filter 350 before being applied to an electronic transmission gate 332. Gate 332 responds to a switching control signal for passing the high frequency signal from the output of filter 330 only during the center portion of the main signal (component 1). At this time gate 332 is open (conductive). Gate 332 is closed (nonconductive) during the time compressed side panel portions of the main signal, e.g., during the illustrated positive pulse intervals of the control signal. The output signal from gate 332 is summed in combiner 334 with the composite video signal appearing at center tap terminal e. The gate control signal is vertically synchronized in response to vertical interval sync pulses associated with the input composite video signal, and is also horizontally synchronized.

FIG. 5 illustrates apparatus suitable for use as interpolator network 443 of FIG. 4. Luminance signal YN is split into low and high frequency portions relative to 1.5 MHz by means of a 1.5 MHz highpass filter 510 and a subtractive combiner 512. A YN high frequency component containing intraframe processed frequencies above 1.5 MHz is applied to an interpolator 515. Interpolator 515 includes 1H delay elements arranged as shown, a multiplexer (MUX) 520, a subtractive combiner 522, multiplier 524 and additive combiners 526 and 530. MUX 520 is switched at the field rate in response to a 30 Hz switching signal, and receives delayed and undelayed versions of the high frequency luminance component. The output of MUX 520 is subtractively combined in unit 522 with a center tap signal from between delay elements 516 and 518, and the combined signal is multiplied by a weighting factor ¼ in multiplier 524. The weighted signal from multiplier 524 and the center tap signal are summed by adder 526, the output of which is summed with the low frequency luminance component YN-LOWS from the delayed output of combiner 512 to reconstitute luminance signal YN before it is applied to network 444. Interpolator 515 exhibits an amplitude response characteristic as shown, which characteristic is somewhat compensated for by vertical peaking provided in intraframe averager 38 as described previously, to maintain a more uniform luminance amplitude characteristic.

A gate 525 is rendered nonconductive during the time compressed side panel intervals to disable the interpolation process during these intervals, because the compressed side panel information of signal N has not been intraframe averaged and therefore does not exhibit jagged diagonal artifacts.

Interpolator networks 435 and 441 of FIG. 4 can employ interpolator network 515 of FIG. 5, with the exception of gate 525. That is, for the interpolator used for networks 435 and 441 the output of multiplier 524 would be continuously coupled to the input of adder 526.

What is claimed is:

1. A system for processing a video signal, comprising:
   means for providing a video signal containing image information defined by picture elements (pixels);
   translating means responsive to said video signal for providing a processed video signal with groups of mutually exclusive pixels of identical value within each group; and
   means for interpolating said processed signal to reduce unwanted image artifacts attributable to said pixel groups, said interpolating means providing different interpolation during alternate image fields of a video signal containing said pixel groups.

2. A system according to claim 1, wherein:
   each said group comprises a pair of vertically spaced pixels associated with correlated image information; and
   said interpolating means vertically interpolates said processed signal.

3. A system according to claim 2, wherein:
   said vertically spaced pixels are spaced 262H apart, where H is a horizontal image line scanning interval.

4. A system according to claim 1, wherein:
   said translating means includes means for intraframe processing pixels associated with each said group.

5. A system according to claim 4, wherein: said intraframe processing means intraframe averages pixels associated with each said group.

6. A system according to claim 1, wherein:
   said processed video signal contains luminance and chrominance components; and
   said interpolating means interpolates said luminance component.

7. A system according to claim 1, wherein: said video signal is a television-type signal representative of a widescreen image having side panel information and main panel information and an aspect ratio greater than that of a standard television image; and
   said translating means is responsive to said main panel information.

8. A system for processing a video signal, comprising means for providing a video signal containing image information defined by picture elements:
   translating means responsive to said video signal for providing a processed video signal with groups of mutually exclusive pixels of identical value within each group, said translating means including means for intraframe processing pixels associated with each said group; and
   means for interpolating said processed signal to reduce unwanted image artifacts; wherein
   said translating means also includes means for vertically peaking pixel information subjected to intraframe processing.

9. A system for processing a video signal, comprising means for providing a video signal containing image information defined by picture elements;
   translating means responsive to said video signal for providing a processed video signal with groups of mutually exclusive pixels of identical value within each group; and
   means for interpolating said processed signal to reduce unwanted image artifacts; wherein
   said video signal is an interlaced signal having odd-numbered image line pixels in a first field and even-numbered image line pixels in a second field forming an image frame with said first field;
   pixels within each said group are spaced 262H apart where H is an image scanning line; and
   said interpolating means interpolates said processed signal in accordance with the expression $x = \frac{3}{4}(B) + \frac{1}{4}(C)$ $y = \frac{1}{4}(A) + \frac{3}{4}(B)$, where A is the value of a first group of identically valued pixels spaced 262H apart;
   B is the value of a second group of identically valued pixels spaced 262 apart and successive to said first group;
   C is the value of a third group of identically valued pixels spaced 262H apart and successive to said second group;
   x is a pixel in said first field coinciding with said second group; and
   y is a pixel in said second field coinciding with said second group.

10. A system according to claim 9, wherein:

A is the average value of pixels in said first group, and
B is the average value of pixels in said second group.

11. In a system for receiving a television-type video signal having image information defined by groups of mutually exclusive picture elements of identical value within each group, apparatus comprising:
means for interpolating said television-type video signal to produce an interpolated signal with reduced unwanted image artifacts attributable to said pixel groups, said interpolating means providing different interpolation during alternate image fields of said television-type video signal; and
means for conveying said interpolated signal to an image signal processing channel.

12. A system according to claim 11, wherein:
each said pixel group comprises a pair of vertically spaced pixels associated with correlated image information; and
said interpolating means vertically interpolates said television signal.

13. A system according to claim 12, wherein:
said vertically spaced pixels are spaced 262H apart, where H is a horizontal image line scanning interval.

14. A system according to claim 12, wherein:
pixels within each said group have been subjected to intraframe averaging.

15. A system according to claim 12, wherein:
said television signal contains luminance and chrominance components; and
said interpolating means interpolates said luminance component.

16. A system according to claim 12, wherein:
said television signal is representative of a widescreen image having side panel information and main panel information and an aspect ratio greater than that of a standard television image; and
said pixel groups are associated with said main panel information.

17. In a system for receiving a television-type signal having image information defined by groups of mutually exclusive picture elements (pixels) of identical value within each group, apparatus comprising:
means for interpolating said television-type signal to produce an interpolated signal; and
means for conveying said interpolated signal to an image signal processing channel; wherein
said television signal is an interlaced signal having odd-numbered image line pixels in a first field and even-numbered image line pixels in a second field forming an image frame with said first field;
pixels within each said group are spaced 262H apart where H is an image scanning line; and
said interpolating means interpolates said processed signal in accordance with the expression $x = \frac{3}{4}(B) + \frac{1}{4}(C)$
$y = \frac{1}{4}(A) + \frac{3}{4}(B)$, where
A is the value of a first group of identically valued pixels spaced 262H apart;
B is the value of a second group of identically valued pixels spaced 262 apart and successive to said first group;
C is the value of a third group of identically valued pixels spaced 262H apart and successive to said second group;
x is a pixel in said first coinciding with said second group; and
y is a pixel in said second field coinciding with said second group.

18. A system according to claim 17, wherein:
A is the average value of pixels in said first group, and
B is the average value of pixels in said second group.

19. In a system for receiving a television-type signal having image information defined by groups of mutually exclusive picture elements (pixels) of identical value within each group, apparatus comprising:
means for interpolating said television-type signal to produce an interpolated signal, said interpolation being frequency limited such that high frequency information is interpolated substantially exclusive of low frequency information; and
means for conveying said interpolated signal to an image signal processing channel.

* * * * *